United States Patent
Faivre et al.

(10) Patent No.: US 11,124,942 B2
(45) Date of Patent: Sep. 21, 2021

(54) SYSTEM FOR CONTROLLING THE POSITION OF A WORK IMPLEMENT

(71) Applicant: Caterpillar Inc., Deerfield, IL (US)

(72) Inventors: Joseph L. Faivre, Edelstein, IL (US); Tianjiao Zuo, Peoria, IL (US); Paul D. Lenzen, Peoria, IL (US); Steven R. Krause, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 326 days.

(21) Appl. No.: 16/402,667

(22) Filed: May 3, 2019

(65) Prior Publication Data

US 2020/0347570 A1 Nov. 5, 2020

(51) Int. Cl.
| | |
|---|---|
| *E02F 3/84* | (2006.01) |
| *G05D 1/02* | (2020.01) |
| *E02F 9/20* | (2006.01) |
| *E02F 3/76* | (2006.01) |

(52) U.S. Cl.
CPC .............. *E02F 3/841* (2013.01); *E02F 3/844* (2013.01); *E02F 9/205* (2013.01); *G05D 1/021* (2013.01); *E02F 3/7604* (2013.01); *G05D 2201/0202* (2013.01)

(58) Field of Classification Search
CPC . E02F 3/841; E02F 9/205; E02F 3/844; E02F 3/7604; E02F 3/7618; E02F 9/265; E02F 9/262; G05D 1/021; G05D 2201/0202
See application file for complete search history.

(56) References Cited

U.S. PATENT DOCUMENTS

| | | | |
|---|---|---|---|
| 6,845,311 B1 | 1/2005 | Stratton et al. | |
| 8,103,417 B2* | 1/2012 | Gharsalli | E02F 3/844 |
| | | | 701/50 |
| 8,548,690 B2 | 10/2013 | Hayashi | |
| 9,328,479 B1* | 5/2016 | Rausch | E02F 3/847 |
| 9,481,977 B1* | 11/2016 | Clar | E02F 9/2045 |
| 9,957,692 B2 | 5/2018 | Morin | |
| 10,066,367 B1* | 9/2018 | Wang | E02F 9/2029 |
| 10,119,244 B2 | 11/2018 | Elkins | |
| 10,794,046 B2* | 10/2020 | Imura | E02F 9/2221 |
| 10,860,016 B1* | 12/2020 | Wang | E02F 9/262 |

(Continued)

*Primary Examiner* — Richard M Camby
(74) *Attorney, Agent, or Firm* — Leydig, Voit & Mayer, Ltd.

(57) ABSTRACT

A system for controlling a ground engaging work implement includes a machine position sensor, a work surface position sensor, a work implement position sensor, and a controller. The controller determines the position of the machine, determines the topography of the work surface, determines a location of a pre-task trigger location adjacent the task start location, and determine a position of the lowest surface of the ground engaging work implement. The controller generates traverse signals to propel the machine from the task end location towards the task start location, generate work implement height signals to maintain the lowest surface of the ground engaging work implement at or above the traversing threshold height as the machine travels from the task end location towards the task start location, and generate work implement lowering signals to lower the work implement to the pre-task threshold height after the machine passes the pre-task trigger location.

20 Claims, 6 Drawing Sheets

(56) References Cited

U.S. PATENT DOCUMENTS

| | | |
|---|---|---|
| 2016/0076222 A1 | 3/2016 | Taylor |
| 2016/0108602 A1 | 4/2016 | Singh |
| 2016/0153175 A1 | 6/2016 | Wei |
| 2018/0038702 A1 | 2/2018 | Lewis |
| 2018/0051446 A1 | 2/2018 | Yoshinada et al. |
| 2018/0119387 A1 | 5/2018 | Sherlock |

* cited by examiner

SYSTEM FOR CONTROLLING THE POSITION OF A WORK IMPLEMENT

TECHNICAL FIELD

This disclosure relates generally to controlling a machine and, more particularly, to a system and method for controlling the work implement of the machine while operating between an end location of a first task and the start location of the next task.

BACKGROUND

Machines such as dozers, motor graders, wheel loaders, etc., are used to perform a variety of tasks. For example, these machines may be used to move material at a work site. The machines may operate in an autonomous, semi-autonomous, or manual manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

When operating in an autonomous or semi-autonomous manner, minimizing the need for operator intervention is desirable. While moving a machine from one location to another between work operations, it is desirable to reduce the likelihood that the work implement will inadvertently engage the work surface. In addition, it is desirable to reduce the cycle time required to prepare the machine for a subsequent work operation.

U. S. Patent Publication No. 2018/0119387 discloses a system for automatically controlling a ripper of a work vehicle based on a desired grade control depth. The control system includes at least one feedback device providing a feedback signal indicative of an actual grade control depth and raises the ripper when the feedback signal indicates the actual grade control depth is equal to the desired grade control depth.

SUMMARY

In one aspect, a system for controlling a ground engaging work implement of a machine while moving the machine along a work surface from a task end location to a task start location includes a machine position sensor, a work surface position sensor, a work implement position sensor, and a controller. The machine position sensor is configured to generate machine position data indicative of a position of the machine. The work surface position sensor is configured to generate elevation data indicative of a topography of the work surface. The work implement position sensor is configured to generate work implement position data indicative of a position of a lowest surface of the ground engaging work implement. The controller is configured to access a reversing threshold height, access a pre-task threshold height, determine the position of the machine based upon the machine position data, determine the topography of the work surface based upon the elevation data, determine a location of a pre-task trigger location adjacent the task start location, and determine a position of the lowest surface of the ground engaging work implement based upon the work implement position data. The controller is further configured to generate traverse signals to propel the machine from the task end location towards the task start location, generate work implement height signals to maintain the lowest surface of the ground engaging work implement at or above the traversing threshold height as the machine travels from the task end location towards the task start location, and generate work implement lowering signals to lower the work implement to the pre-task threshold height after the machine passes the pre-task trigger location.

In another aspect, a method of controlling a ground engaging work implement of a machine while moving the machine along a work surface from a task end location to a task start location includes accessing a traversing threshold height, accessing a pre-task threshold height, determining a position of the machine based upon machine position data from a machine position sensor associated with the machine, determining a topography of the work surface based upon position data from a work surface position sensor, determining a location of a pre-task trigger location adjacent the work location, and determining a position of a lowest surface of the ground engaging work implement based upon work implement position data from a work implement position sensor associated with the machine. The method further includes generating traverse signals to propel the machine from the task end location towards the work location, generating work implement height signals to maintain the lowest surface of the ground engaging work implement at or above the traversing threshold height as the machine travels from the task end location towards the work location, and generating work implement lowering signals to lower the ground engaging work implement to the pre-task threshold height after the machine passes the pre-task trigger location.

In still another aspect, a machine includes a prime mover, a ground engaging work implement a machine position sensor, a work surface position sensor, a work implement position sensor, and a controller. The ground engaging work implement having a lowest surface for engaging a work surface. The machine position sensor is configured to generate machine position data indicative of a position of the machine. The work surface position sensor is configured to generate elevation data indicative of a topography of the work surface. The work implement position sensor is configured to generate work implement position data indicative of a position of a lowest surface of the ground engaging work implement. The controller is configured to access a traversing threshold height, access a pre-task threshold height, determine the position of the machine based upon the machine position data, determine the topography of the work surface based upon the elevation data, determine a location of a pre-task trigger location adjacent the task start location, and determine a position of the lowest surface of the ground engaging work implement based upon the work implement position data. The controller is further configured to generate traverse signals to propel the machine from the task end location towards the task start location, generate work implement height signals to maintain the lowest surface of the ground engaging work implement at or above the traversing threshold height as the machine travels from the task end location towards the task start location, and generate work implement lowering signals to lower the work implement to the pre-task threshold height after the machine passes the pre-task trigger location.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1:
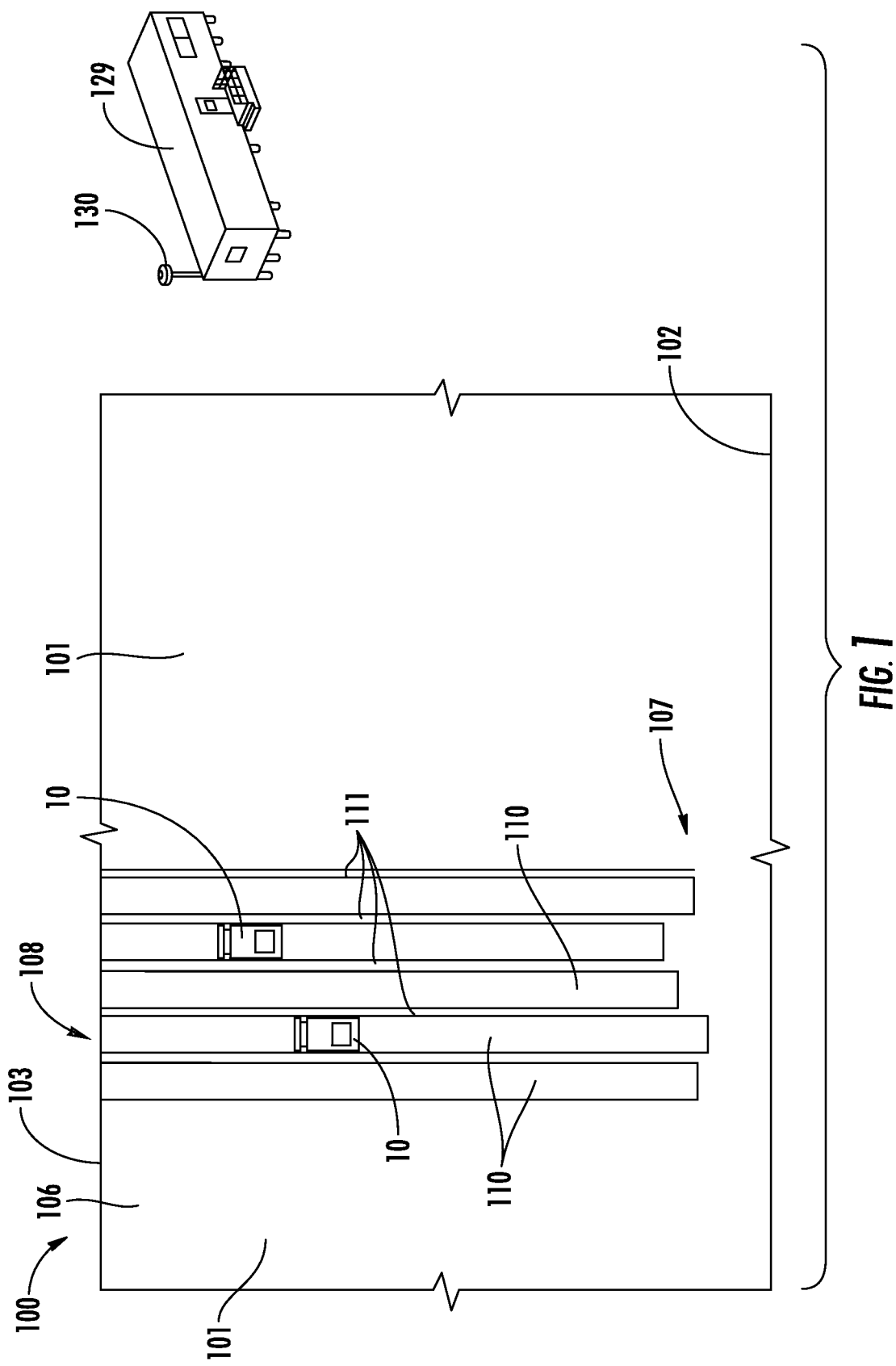
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

As used herein, a machine 10 operating in an autonomous manner operates automatically based upon information received from various sensors without the need for human operator input. A machine operating semi-autonomously includes an operator, either within the machine or remotely, who performs some tasks or provides some input and other tasks are performed automatically and may be based upon information received from various sensors. A machine being operated manually is one in which an operator is controlling all or essentially all of the functions of the machine. A machine may be operated remotely by an operator (i.e., remote control) in either a manual or semi-autonomous manner.

Figure 2:
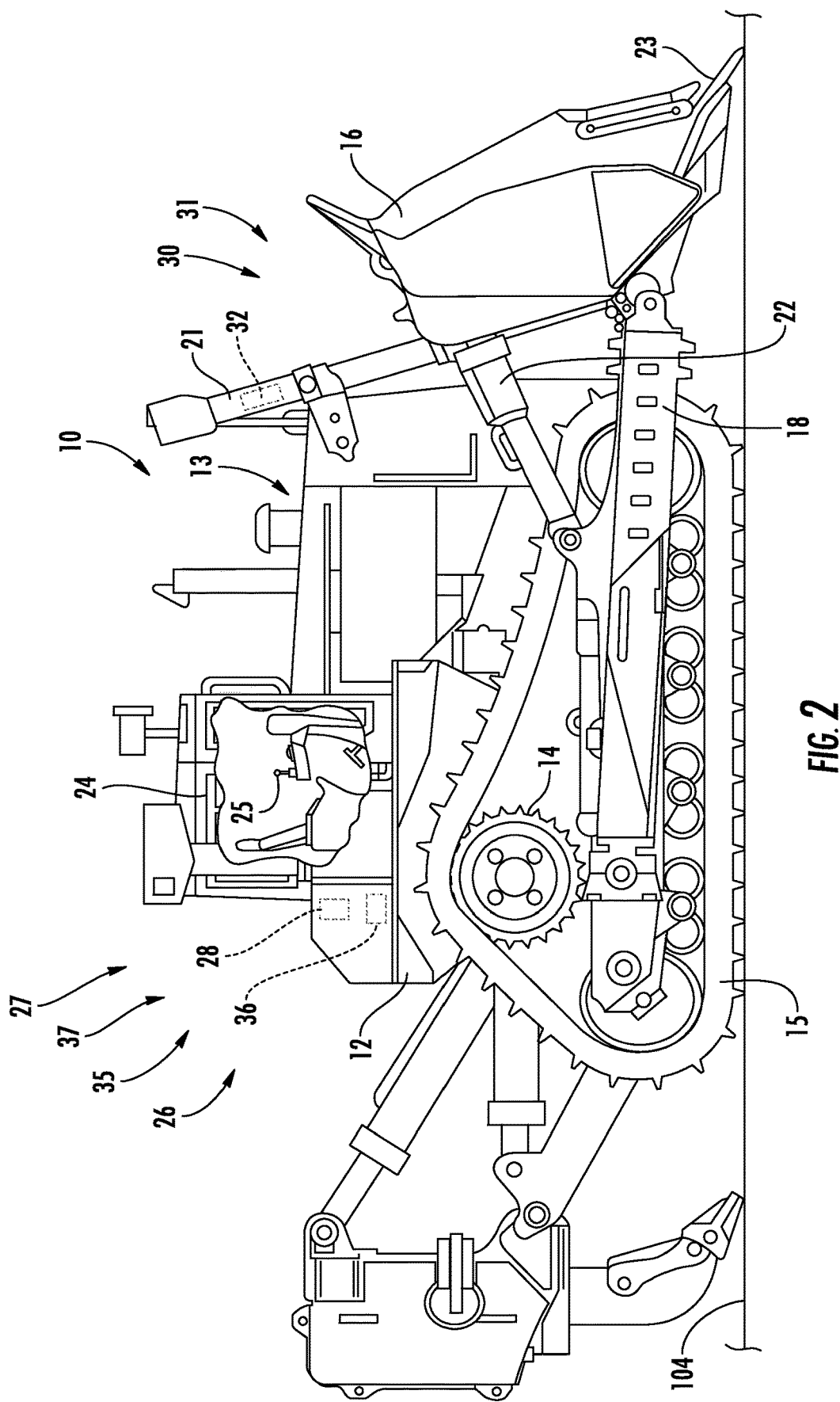
FIG. 2 depicts a diagrammatic illustration of a machine in accordance with the disclosure.

FIG. 2 depicts a diagrammatic illustration of a machine 10 such as a dozer with a ground-engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although the machine 10 is shown in a "track-type" configuration, other configurations, such as a wheeled configuration, may be used. Operation of the engine 13 and a transmission (not shown), which are operatively connected to the drive sprockets 14 and the tracks 15, may be controlled by a control system 35 including a controller 36. The systems and methods of the disclosure may be used with any machine propulsion and drivetrain mechanisms applicable in the art including hydrostatic, electric, or mechanical drives.

Blade 16 may be pivotally connected to the frame 12 by arms 18 on each side of machine 10. A first hydraulic cylinder 21 coupled to the frame 12 supports the blade 16 in the vertical direction and allows the blade 16 to move up or down vertically from the point of view of FIG. 2. a pair of second hydraulic cylinders 22, with one on each side of the machine 10, allow the pitch angle of the blade tip 23 to change relative to a centerline of the machine.

The machine 10 may include a cab 24 that an operator may physically occupy and provide input to control the machine. The cab 24 may include one or more input devices such as a joystick 25 through which the operator may issue commands to control the propulsion system and steering system of the machine as well as operate various implements associated with the machine.

The machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within the cab 24 or off-board the machine through a wireless communications system 30. The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 129 (FIG. 1). The functionality of control system 35 may be distributed so that certain functions are performed at the machine 10 and other functions are performed remotely. In such case, the control system 35 may include a communications system such as the wireless communications system 130 for transmitting signals between the machine 10 and a system located remote from the machine.

The machine 10 may be configured to be operated autonomously, semi-autonomously, or manually. When operating semi-autonomously or manually, the machine 10 may be operated by remote control and/or by an operator physically located within the cab 24.

The machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A machine position sensing system 27, as shown generally by an arrow in FIG. 2 indicating association with the machine 10, may include a machine position sensor 28, to sense the position and orientation (i.e., the heading, pitch, roll or tilt, and yaw) of the machine relative to the work site 100. The position and orientation of the machine 10 are sometimes collectively referred to as the position of the machine. The machine position sensor 28 may include a plurality of individual sensors that are configured to generate and provide machine position data or signals to the controller 36 indicative of the position and orientation of the machine 10.

In one example, the machine position sensor 28 may include one or more sensors that interact with a positioning system such as a global navigation satellite system or a global positioning system to operate as a position sensor. In another example, the machine position sensor 28 may further or alternately include an inertial measurement unit and/or a slope or inclination sensor, such as pitch angle sensor, for measuring the slope or inclination of the machine 10 relative to a ground or earth reference. The controller 36 may use machine position signals from the machine position sensor 28 to determine the position of the machine 10 within work site 100. In other examples, the machine position sensor 28 may include an odometer or another wheel rotation sensing sensor, a perception based system, or may use other systems such as lasers, sonar, or radar to determine all or some aspects of the position of the machine 10.

In addition, the machine position sensing system 27 may also be used to determine the elevation or topography of the work surface 104 upon which the machine 10 is moving. More specifically, based upon known dimensions of the machine 10 and the elevation of the machine at the work site 100, the elevation or topography of the work surface 104 may also be determined. As a result, the machine position sensing system 27 may operate as either or both of a machine position sensing system and a work surface position sensing system. Similarly, the machine position sensor 28 may operate as either or both of a machine position sensor and a work surface position sensor. The machine position sensor 28 may thus also operate as a work position sensor to generate elevation data or signals that are interpreted by the controller 36 to determine the relevant elevation or topography of the work surface 104. Other sensors or a dedicated work surface position sensor, such as on another ground-based machine (not shown) or a drone (not shown), may alternatively be used to generate elevation data indicative of the elevation or topography of the work surface 104. The data indicative of the elevation or topography of the work surface 104 may be expressed or taken from any of a number of reference frames or perspectives (e.g., relative to the earth, the work site 100, the machine 10, etc.).

A work implement position sensing system 31, as shown generally by an arrow in FIG. 2 indicating association with the machine 10, may include a work implement position sensor 32, to sense the position of the work implement, such as the blade 16. Based upon the known dimensions of the blade 16, the position or height of the lowest surface such as the tip 23 may be determined from the work implement position data. In an embodiment, the work implement position sensor 32 may comprise a cylinder position sensor located on the first hydraulic cylinder 21 configured to generate and provide to the controller 36 the work implement position data or signals indicative of the position of the blade 16.

Figure 3:
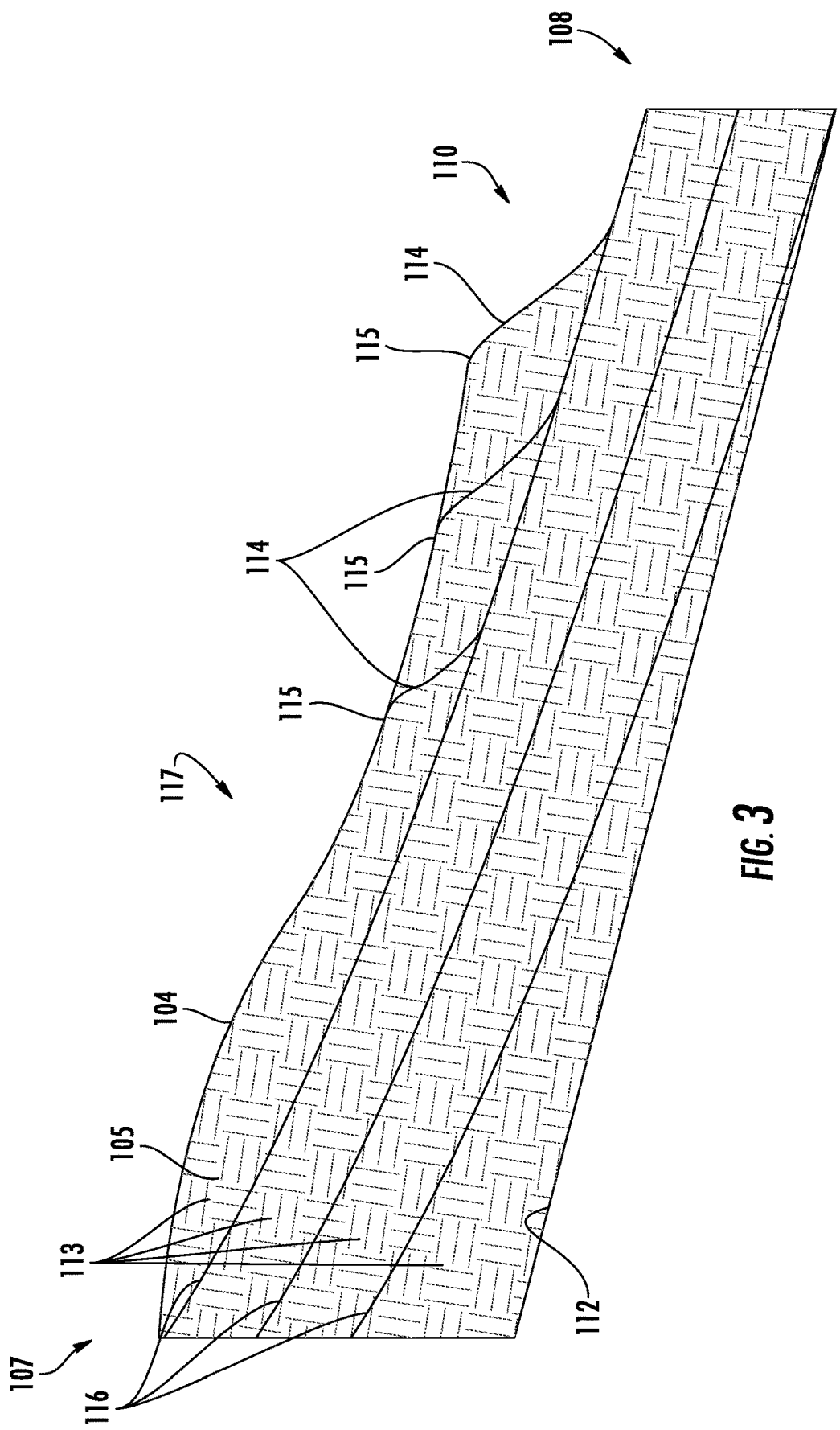
FIG. 3 depicts a diagrammatic cross-section of a portion of a work site illustrating various aspects of a material moving plan.

Referring to FIG. 3, the machine 10 may be configured to move material at the work site 100 according to one or more material movement plans along a path 117 from a first location 107 to a path or task end location such as dump location 108. The dump location 108 is typically but not always located downhill from the first location. The dump location 108 may be at crest 103 or at any other location. The material movement plans may include, among other things, forming a plurality of spaced apart channels or slots 110 that are cut into the work surface 104 at work site 100 along a path from the first location 107 to the dump location 108. In doing so, each machine 10 may move back and forth along a path 117 between the first location 107 and the dump location 108.

As depicted in FIG. 3, in one embodiment, each slot 110 may be formed by removing material 105 from the work surface 104 in one or more layers 113 until the final work surface or final design plane 112 is reached. The blade 16 of machine 10 may engage the work surface 104 with a series of cuts 114 that are spaced apart lengthwise along the slot 110. Each cut 114 begins at a task start location such as a cut location 115 along the work surface 104 at which the blade 16 engages the work surface and extends into the material 105 and moves towards the target surface 116 for a particular layer. In many operations, the cut locations 115 begin at a location closest to the dump location 108 and are moved progressively back or uphill towards the first location 107. Thus, as depicted in FIG. 3, material is moved by performing a plurality of cut operations at sequential cut locations 115 from right to left for a particular layer 113 until the entire target surface 116 is exposed. The process is then repeated for each subsequent layer 113.

As used herein, the word "uphill" refers to a direction towards the high wall 102 relative to the crest 103 or dump location 108. Similarly, the word "downhill" refers to a direction towards the crest 103 or dump location 108 relative to the high wall 102.

Spreading or dumping the material may be accomplished in any desired manner. In one embodiment, the material or overburden along the work surface until reaching and falling down a downward slope or crest. In a second embodiment, the material or overburden is pushed along the work surface until reaching a desired end of travel location. Upon reaching the desired end of travel location, the machine 10 is operated in reverse which leaves a pile of material on the work surface along which the machine is operating. In either embodiment, after reaching the path end or end of travel position, a reversing operation is performed by propelling the machine 10 in reverse away from the path end or end of travel position until the machine reaches a position on the work surface 104 at which the tip 23 of the blade 16 is aligned with the next cut location and the next sequential material moving operation is performed.

In some embodiments, the machine 10 may be propelled up the work surface 104 past the next cut location 115 until reaching a reverse-to-forward shift location 118 positioned uphill from the next cut location. In other words, referring to FIG. 4, the reversing operation includes a first section indicated by an arrow 122 extending between the dump location 108 and the cut location 115 and a second section indicated by an arrow 123 extending between the cut location 115 and the reverse-to-forward shift location 118. Once reaching the reverse-to-forward shift location 118, forward propulsion signals may be generated to propel the machine 10 towards the cut location 115 with the blade 16 above the work surface 104. After the blade 16 reaches the cut location 115, the material movement process is repeated with the blade 16 cutting into the work surface 104 at the cut location and moving the material to the dump location 108.

The control system 35 may include a module or planning system 37 for determining or planning various aspects of the excavation plan. The planning system 37 may receive and store various types of input such as the configuration of the work surface 104, the final design plane 112, a desired target profile, and characteristics of the material to be moved. The planning system 37 may simulate the results of cutting the work surface 104 at a plurality of cut locations, and then choose the next cut location that creates the most desirable results based on one or more criteria. The planning system 37 may also be operative to plan other aspects of the material moving plan.

In embodiments, the planning function may be performed while operating the machine 10. In other embodiments, some or all aspects of the planning function may be performed ahead of time and the various inputs to the planning system 37 and the results and related data stored as part of the data maps of the controller 36.

The control system 35 may also include a traversing implement position system 38 operative to control the position of the blade 16 as the machine 10 moves to the next task start or cut location 115 from its task end or end of travel position such as at dump location 108. More specifically, after the machine 10 has moved material from a previous cut location to the dump location 108, the machine will be moved in reverse along the work surface 104 to the next cut location 115. In many instances, the work surface 104 will not be flat and thus the machine 10 may pitch forward and backwards as the machine is propelled along the path 117. For example, referring to FIG. 4, as the machine 10 travels in reverse, it may encounter bumps 120 that cause the front of the machine to move down and then up as the machine travels over the bump. Similarly, the machine 10 may encounter holes or recesses 121 in the work surface 104 that cause the front of the machine 10 to move up and then down as the machine travels through the recess.

In either case, movement of the front of the machine 10 downward may cause the lowest surface such as the tip 23 of the blade 16 to contact the work surface 104 and drag material as the machine is propelled along the path 117. Accordingly, the traversing implement position system 38 may operate by maintaining the lowest surface, such as the tip 23, of the blade 16 at or above a specified height while the machine operates to traverse the work site 100 to position the work implement at the next task start location. Maintaining the lowest surface (e.g., the tip 23) of the blade 16 at or above such a "traversing threshold height" depicted at 150 in FIG. 5 operates to minimize the likelihood that the blade will contact the work surface 104 as the machine 10 is propelled in reverse to the next cut location.

In some embodiments, the traversing implement position system 38 may be configured to maintain the lowest surface (e.g., tip 23) of the work implement (e.g., blade 16) at a specified height (i.e., the traversing threshold height 150) relative to the machine 10. For example, the traversing implement position system 38 may move the blade 16 upward so that the lowest surface (e.g., tip 23) remains a specified distance (e.g., 1 m) above the bottom of the machine as the machine 10 is traveling on the work surface 104. However, as the machine 10 moves over bumps 120 and recesses 121, the actual distance between the lowest surface of the work implement and the work surface 104 may vary as a result of the front of the machine moving up and down.

In other embodiments, the traversing implement position system 38 may be configured to maintain the lowest surface (e.g., tip 23) of the work implement (e.g., blade 16) at a specified height or distance (i.e., the traversing threshold height 150) above the work surface 104 even as the topography of the work surface 104 changes such as by continuously adjusting the position of the blade relative to the machine 10. In such case, the traversing implement position system 38 may generate height signals that adjust the position of the blade 16 relative to the machine 10 based upon the topography of the work surface as the machine travels along the path 117. Through such a configuration, the traversing implement position system 38 will maintain the lowest surface of the work implement at a distance above the work surface 104 at least equal to the traversing threshold height 150 as the machine 10 is propelled in reverse.

Further, in order for the machine 10 to operate as efficiently as possible, it may be desirable to lower the blade 16 towards the work surface 104 as the machine approaches the next task start location. In other words, rather than maintaining the lowest surface (e.g., tip 23) of the blade 16 above the traversing threshold height 150 during the entire reversing operation, the traversing implement position system 38 may operate to position the lowest surface of the work implement at or above the traversing threshold height during most of the reversing operation and then operate to lower the lowest surface of the work implement towards the work surface 104 as the machine 10 approaches the next task start location (e.g., cut location 115).

For example, the traversing implement positioning system 38 may begin lowering the blade 16 at a pre-task trigger location 119 (FIG. 4) to gradually lower the blade so that it eventually reaches a pre-task threshold height (depicted at 151 in FIG. 5) at a position aligned with the cut location 115. In an embodiment, the pre-task threshold height 151 may be slightly above the work surface 104. In a first embodiment, the lowering process may be linear with respect to time, as depicted in FIG. 5 and, in a second embodiment, may be linear with respect to the distance that the machine is traveling.

Figure 4:
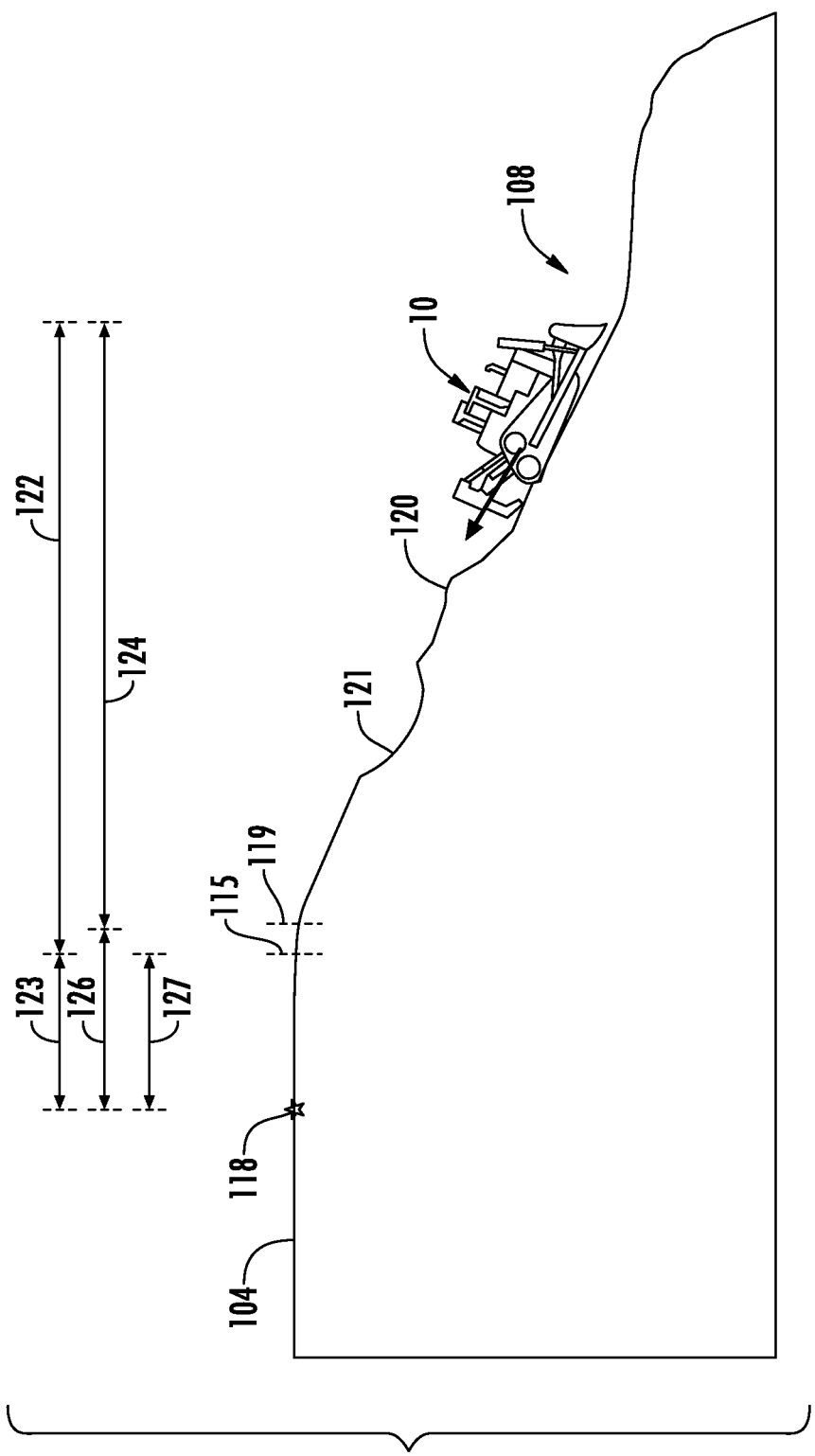
FIG. 4 depicts a diagrammatic cross-section of a portion of a work site illustrating the different sections of the reversing operation.
Figure 5:
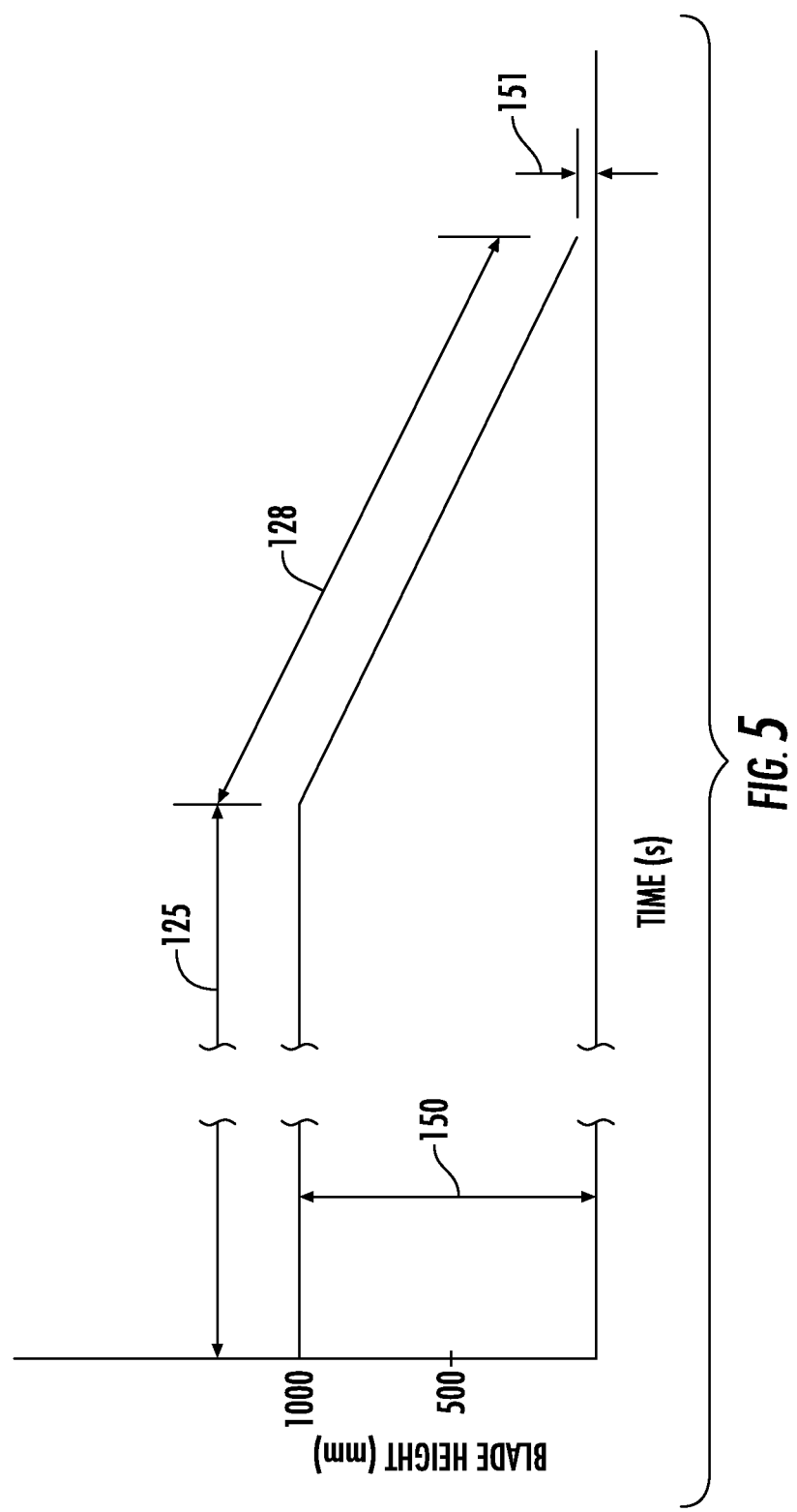
FIG. 5 depicts an exemplary graph of the blade height as a function of time from the beginning of the reversing operation until the blade is at the next cut level.

The distance traveled during the reversing operation in which the blade 16 is maintained at the traversing threshold height 150 is depicted at 124 in FIG. 4 and the corresponding elapsed time is depicted at 125 in FIG. 5. The distance traveled during the reversing operation in which the blade 16 is moving towards the pre-task threshold height 151 is depicted at 126 in FIG. 4 and the distance traveled from the reverse-to-forward shift location 118 to the cut location 115 in which the blade 16 is moving towards the pre-task threshold height 151 is depicted at 127. The corresponding elapsed time for the movement of the machine 10 while the blade is moved to the pre-task threshold height 151 is depicted at 128 in FIG. 5

The controller 36 may operate by generating work implement lowering signals to lower the blade 16 to the pre-task threshold height 151 after the machine 10 passes the pre-task trigger location 119. By way of example, in an embodiment, the machine 10 may travel between 50-100 yards during the reversing operation and approximately 10-15 yards during a pre-task threshold operation (i.e., the machine travel distance between the pre-task trigger location 119 and the cut location 115). The reverse-to-forward shift location 118 may be 5 yards uphill from the cut location 115 so that if the pre-task threshold distance is 12 yards, the pre-cut trigger location 119 is 2 yards downhill from the cut location 115. In such an example, the pre-task trigger location 119 may be considered adjacent the cut location 115 if it is within 5-7.5 yards of the cut location. The length of the pre-task threshold distance may be dependent on the size of the machine 10, with larger machines requiring larger pre-task threshold distances. The pre-task trigger location 119 may be downhill or uphill from the cut location, depending upon the location of the reverse-to-forward shift location 118 and the rate at which the blade 16 is being lowered. Through such an operation, time is not wasted adjacent the cut location 115 while the blade 16 is lowered from the traversing threshold height 150 to the pre-task threshold height 151 adjacent the cut location 115.

The traversing threshold 150 height may be set based upon the expected terrain or topography of the work surface 104. For example, the larger the bumps 120 and recesses 121, the greater the traversing threshold height in order to minimize the likelihood that the lowest surface of the blade 16 will contact the work surface 104 during the reversing operation. Accordingly, in some instances, the controller 36 may have stored therein or access a plurality of different traversing threshold heights that are to be selected or accessed and used based upon the topography of the work surface 104. For example, the controller 36 may store first and second different traversing threshold heights and select the traversing threshold height based upon the variations in topography of the work surface. In some instances, it may be desirable to use the lowest traversing threshold height for a particular topography since operating the machine 10 with the blade 16 at a relatively high position may decrease the stability of the machine. This may occur, for example, when the machine 10 is operating on a side slope.

INDUSTRIAL APPLICABILITY

The industrial applicability of the traversing implement position system 38 described herein will be readily appreciated from the forgoing discussion. The foregoing discussion is applicable to systems in which one or more machines 10 are operated autonomously, semi-autonomously, or manually at a work site 100 to move material. Such system may be used at a mining site, a landfill, a quarry, a construction site, a roadwork site, a forest, a farm, or any other area in which movement of material is desired. The machines 10 may include a work implement that is moved above the work surface 104 from the location at which a first task is completed to a location at which the next task will begin.

Figure 6:
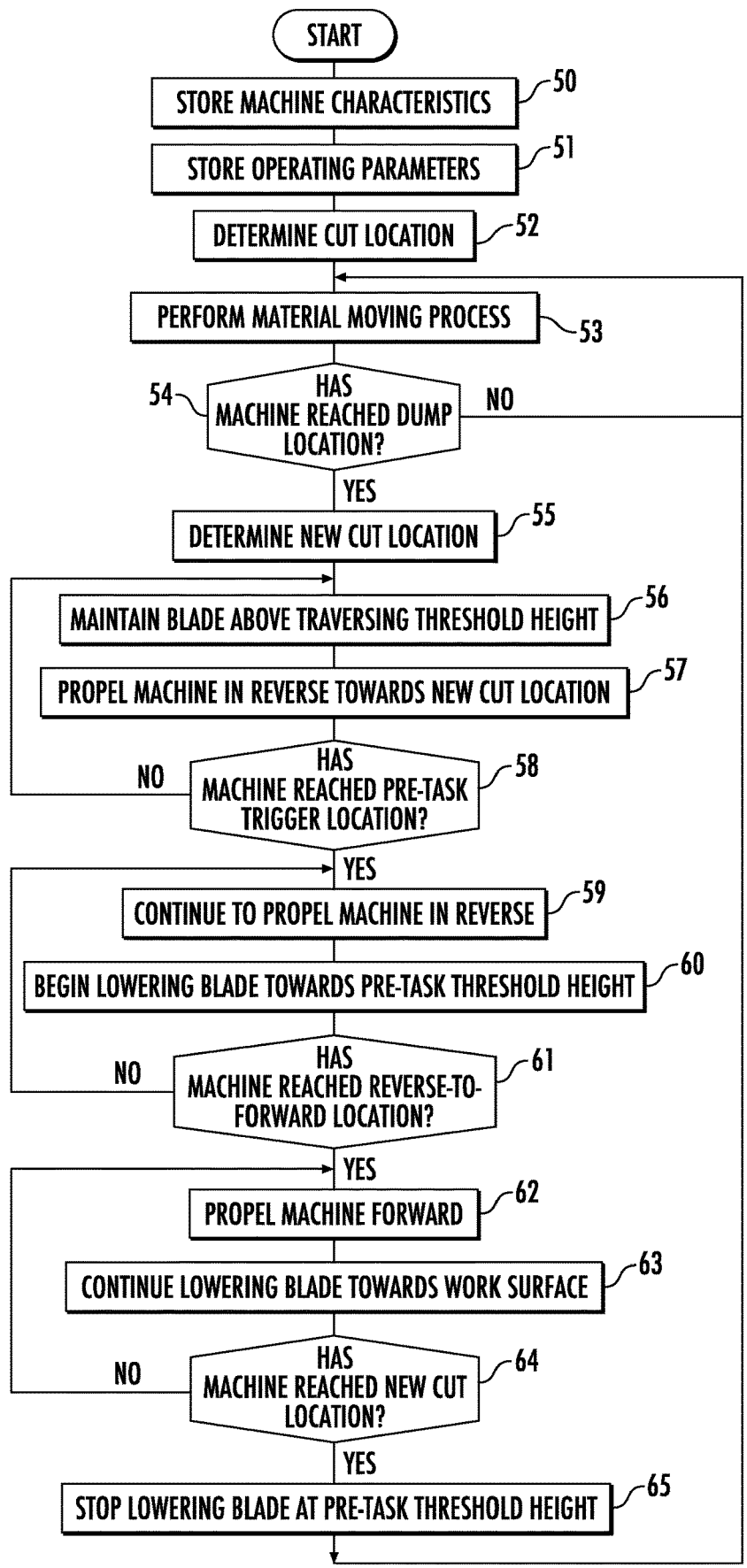
FIG. 6 depicts a flowchart illustrating a material moving process in accordance with the disclosure.

Referring to FIG. 6, a flowchart illustrating an exemplary operation of the traversing implement position system 38 is depicted. At stage 50, the characteristics of the machine 10 may be stored within or accessed by the controller 36. The machine characteristics may include, for example, the dimensions of the machine 10. The dimensions of the machine 10 may include, for example, the location of the bottom of the tracks 15 relative to the position of the machine position sensor 28 so that the elevation or topography of the work surface 104 may be determined as the machine 10 travels along the path 117. This permits the machine position sensor 28 to also operate as a position sensor operative to determine the elevation of the work surface 104.

Operating parameters of the traversing implement position system 38 may be stored within or accessed by the controller 36 at stage 51. One operating parameter may include, for example, the traversing threshold height 150 that defines the minimum height of the lowest portion of the blade 16 such as the tip 23 relative to the bottom of the machine 10 or the work surface 104, depending upon how the traversing implement position system 38 is configured. Another operating parameter may include the pre-task threshold height 151 that defines the target height of the lowest surface of the blade 16 above the work surface 104 immediately prior to beginning a cutting operation. The operating parameters may also include the distance from the cut location 115 used to determine the location of the reverse-to-forward shift location 118 that defines when or where the machine 10 will stop its reversing operation and begin to move forward towards the cut location. Still another operating parameter may include the distance from the cut location 115 used to determine the location of the pre-task trigger location 119 that defines when or where the traversing implement position system 38 will begin to lower the blade from the traversing threshold height 150 towards the pre-task threshold height 151.

The actual reverse-to-forward shift locations 118 and the pre-task trigger locations 119 are not stored as an operating parameter but rather the distance relative to each cut location 115 may be stored as an operating parameter. Thus, once the planning system 37 determines the location of the next cut location 115, the traversing implement positioning system 38 may determine the reverse-to-forward shift location and the pre-task trigger location.

At stage 52, the controller 36 may determine the initial cut location 115 along the path 117. At stage 53, the machine 10 may be operated to perform a material moving process by cutting into the work surface 104 at the initial cut location 115 and moving the material along the path 117 to the dump location 108. The controller may determine at decision stage 54 whether the machine 10 has reached the dump location 108. If the machine has not reached the dump location, operation of the machine is continued and stages 53-54 repeated.

Once the machine 10 has reached the dump location 108, the controller 36 may determine a new cut location 115 at stage 55. The controller 36 may raise the blade 16 at stage 56 to the traversing threshold height 150 to reduce the likelihood that the lowest surface of the blade 16 will contact the work surface 104 as the machine 10 moves along the path 117 to the cut location 115. At stage 56, the controller 36 may generate reverse signals to propel the machine in reverse from the path end such as the dump location 108 towards the cut location 115.

At decision stage 58, the controller 36 may determine whether the machine 10 has reached the pre-task trigger location 119 generally adjacent the cut location 115. If the machine 10 has not reached the pre-task trigger location 119, the machine operation may continue unchanged and stages 56-58 repeated.

If the machine 10 has reached the pre-task trigger location 119, the controller 36 may at stage 59 continue to propel the machine 10 in reverse. At stage 60, the controller 36 may begin lowering the blade 16 towards the pre-task threshold height 151. The controller 36 may lower the blade 16 at a rate such that the tip 23 of the blade 16 will reach the pre-task threshold height 151 at or somewhat before the tip 23 of the blade is aligned with cut location 115.

At decision stage 61, the controller 36 may determine whether the machine 10 has reached the reverse-to-forward shift location 118. If the machine 10 has reached the reverse-to-forward shift location 118, the controller 36 may generate a braking command to stop the machine and then generate at stage 62 a pre-cut forward command to propel the machine 10 from the reverse-to-forward shift location towards the cut location 115. At stage 63, the controller 36 may continue to lower the blade 16 towards the pre-task threshold height 150.

The controller 36 may determine at decision stage 64 whether the machine 10 has reached the cut location 115. If the machine 10 has not reached the cut location 115, stages 62-64 may be repeated with the machine continuing to move towards the cut location 115 and the blade 16 moving downward towards the pre-task threshold height 151. If the machine 10 has reached the cut location 115, the controller 36 may at stage 65 stop lowering the blade 16 at the pre-task threshold height 151. The controller 36 may then begin the next material cutting operation and stages 53-65 repeated.

In some instances, the blade 16 may reach the pre-task threshold height 151 prior to the machine 10 reaching the cut location 115. In such case, the traversing implement position system 38 may be configured to stop lowering the blade 16 upon the blade reaching the pre-task threshold height even though the machine 10 has not reached the cut location 115.

It will be appreciated that the foregoing description provides examples of the disclosed system and technique. However, it is contemplated that other implementations of the disclosure may differ in detail from the foregoing examples. For example, the traversing implement position system 38 may also be used when other types of work implements are traversing the work site 100 above the work surface 104 to move to their next task start location from the task end location of the previous task.

As an example, when moving a bucket (not shown) full of material from a dig location to a dump location, material may fall from the bucket and alter the topography at the work site. Accordingly, it may be desirable to utilize the traversing implement position system 38 to ensure that the bucket remains at or above a traversing threshold height while the bucket is returned to the next dig location. In doing so, the traversing threshold height may be relative to the machine 10 or the work surface 104. Still further, in some instances a machine such as a scraper may be used at a first location and then transported to a second location to perform another material moving operation. The traversing implement position system 38 may be used to maintain the work implement of the scraper at or above a desired height, either relative to the machine or the work surface.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling a ground engaging work implement of a machine while moving the machine along a work surface from a task end location to a task start location, comprising:
   a machine position sensor configured to generate machine position data indicative of a position of the machine;
   a work surface position sensor configured to generate elevation data indicative of a topography of the work surface;
   a work implement position sensor configured to generate work implement position data indicative of a position of a lowest surface of the ground engaging work implement; and
   a controller configured to:
      access a traversing threshold height;
      access a pre-task threshold height;
      determine the position of the machine based upon the machine position data;
      determine the topography of the work surface based upon the elevation data;
      determine a location of a pre-task trigger location adjacent the task start location;
      determine a position of the lowest surface of the ground engaging work implement based upon the work implement position data;
      generate traverse signals to propel the machine from the task end location towards the task start location;
      generate work implement height signals to maintain the lowest surface of the ground engaging work implement at or above the traversing threshold height as the machine travels from the task end location towards the task start location; and
      generate work implement lowering signals to lower the work implement to the pre-task threshold height after the machine passes the pre-task trigger location.

2. The system of claim 1, wherein the traversing threshold height is relative to the work surface.

3. The system of claim 1, wherein the traversing threshold height is relative to the machine.

4. The system of claim 1, wherein the traverse signals are operative to propel the machine along a path from the a path end location past a cut location and to a reverse-to-forward shift location and the controller is further configured to generate a pre-cut forward command to propel the machine from the reverse-to-forward shift location to the cut location.

5. The system of claim 4, wherein the work implement height signals maintain the lowest surface of the ground engaging work implement at or above the traversing threshold height at least until the machine reaches the cut location prior to reaching the reverse-to-forward shift location.

6. The system of claim 4, wherein the controller is further configured to begin generating the work implement lowering signals upon the machine reaching the cut location prior to reaching the reverse-to-forward shift location.

7. The system of claim 1, wherein the work implement lowering signals are operative to lower the ground engaging work implement linearly between the traversing threshold height and the pre-task threshold height.

8. The system of claim 7, wherein the work implement lowering signals are operative to the lower the ground engaging work implement linearly with respect to time.

9. The system of claim 7, wherein the work implement lowering signals are operative to lower the ground engaging work implement linearly with respect to a distance traveled by the machine along the path.

10. The system of claim 1, wherein the pre-task trigger location is adjacent the work location.

11. The system of claim 10, wherein the pre-task trigger location is downhill from the work location.

12. The system of claim 10, wherein the pre-task trigger location is uphill from the work location.

13. The system of claim 1, wherein the traversing threshold height is based upon the topography of the work surface along the path.

14. The system of claim 13, wherein controller is further configured to store a first traversing threshold height and a second traversing threshold height, and access the first traversing threshold height upon the topography of the work surface varying by a first height threshold and access the second traversing threshold height upon the topography of the work surface varying by a second height threshold, the second height threshold being greater than the first height threshold.

15. A method of controlling a ground engaging work implement of a machine while moving the machine along a work surface from a task end location to a task start, comprising:
  accessing a traversing threshold height;
  accessing a pre-task threshold height;
  determining a position of the machine based upon machine position data from a machine position sensor associated with the machine;
  determining a topography of the work surface based upon position data from a work surface position sensor;
  determining a location of a pre-task trigger location adjacent the work location;
  determining a position of a lowest surface of the ground engaging work implement based upon work implement position data from a work implement position sensor associated with the machine;
  generating traverse signals to propel the machine from the task end location towards the work location;
  generating work implement height signals to maintain the lowest surface of the ground engaging work implement at or above the traversing threshold height as the machine travels from the task end location towards the work location; and
  generating work implement lowering signals to lower the ground engaging work implement to the pre-task threshold height after the machine passes the pre-task trigger location.

16. The method of claim 15, further comprising maintaining the lowest surface of the ground engaging work implement at or above the traversing threshold height relative to the work surface.

17. The method of claim 15, further comprising maintaining the lowest surface of the ground engaging work implement at or above the traversing threshold height relative to the machine.

18. The method of claim 15, wherein the traverse signals are operative to propel the machine along a path from the task end location past a cut location and to a reverse-to-forward shift location and further comprising generating a pre-cut forward command to propel the machine from the reverse-to-forward shift location to the cut location.

19. The method of claim 18, further comprising beginning to generate the work implement lowering signals upon the machine reaching the cut location prior to reaching the reverse-to-forward shift location.

20. A machine, comprising:
  a prime mover;
  a ground engaging work implement having a lowest surface for engaging a work surface;
  a machine position sensor configured to generate machine position data indicative of a position of the machine;
  a work surface position sensor configured to generate elevation data indicative of a topography of the work surface;
  a work implement position sensor configured to generate work implement position data indicative of a position of the lowest surface of the ground engaging work implement; and
  a controller configured to:
    access a traversing threshold height;
    access a pre-task threshold height;
    determine the position of the machine based upon the machine position data;
    determine the topography of the work surface based upon the elevation data;
    determine a location of a pre-task trigger location adjacent a work location;
    determine a position of the ground engaging work implement based upon the work implement position data;
    generate traverse signals to propel the machine from a task end location towards a work location;
    generate work implement height signals to maintain the lowest surface of the ground engaging work implement at or above the traversing threshold height as the machine travels from the task end location towards the work location; and
    generate work implement lowering signals to lower the ground engaging work implement to the pre-task threshold height after the machine passes the pre-task trigger location.

* * * * *